April 7, 1959 M. K. HAYNES 2,881,414

MAGNETIC MEMORY SYSTEM

Filed July 8, 1954 3 Sheets-Sheet 1

INVENTOR.
MUNRO K. HAYNES

BY William V. Schelberg

AGENT

INVENTOR.
MUNRO K. HAYNES
BY William V. Schelberg
AGENT

April 7, 1959 M. K. HAYNES 2,881,414

MAGNETIC MEMORY SYSTEM

Filed July 8, 1954 3 Sheets-Sheet 3

INVENTOR.
MUNRO K. HAYNES
BY William V. Schellberg
AGENT 2,881,414

MAGNETIC MEMORY SYSTEM

Munro K. Haynes, Poughkeepsie, N.Y., assignor to International Business Machines Corporation, New York, N.Y., a corporation of New York Application July 8, 1954, Serial No. 442,013

9 Claims. (Cl. 340—174)

This invention relates to coincidence current magnetic core matrix memory systems and is directed in particular to arrangements for obtaining reading signals therefrom free of undesirable disturbances.

In matrices of magnetic cores employed for storage of binary information as represented by relative stable remanance states, a read out signal is obtained from a winding linking each core of a digit plane of the array. Since these cores exhibit hysteresis characteristics having a substantial departure from rectangular form and in themselves are somewhat dissimilar, cores partially excited in the course of interrogation contribute to the production of disturbance signals which may preclude reliable recognition between a stored one or zero signal representation from an interrogated core. This problem has hindered the use of magnetic memory arrays and has likewise limited their size and application.

In accordance with the present invention means are provided to substantially limit the effects of disturbance signals in accordance with several approaches to the problem. A first technique provides for application of coincident read signals displaced in time but overlapping in duration whereby the partially energized cores in one coordinate dimension of the array produce a disturbance signal which decays before the sensing circuits are activated. A second solution, and one which may be used in conjunction with the first, resides in integrating the output signal over a period during which the noise signals substantially cancel out including disturbances picked up from the drive windings in addition to the signals from the partially actuated cores. When this approach is employed in conjunction with the first mode of operation described, the combination provides means for limiting further undesirable signal amplitudes with a consequent reduction in the recovery time required by a signal amplifier conventionally coupled in the read out circuit.

Accordingly, one broad object of the invention is to provide means for limiting the effects of disturbance signals on interrogation of a matrix of magnetic cores employed as a memory organ.

A more specific object is to provide a method of coincidence current read out whereby the read pulses are displaced in time and the disturbance signals from certain of the half selected core elements are diminished.

Still another object of the invention is to provide a system for integrating the output signal whereby disturbance signals contributing to the noise level are substantially eliminated.

Other objects of the invention will be pointed out in the following description and claims and illustrated in the accompanying drawings, which disclose, by way of example, the principle of the invention and the best mode, which has been contemplated, of applying that principle.

Figure 2:
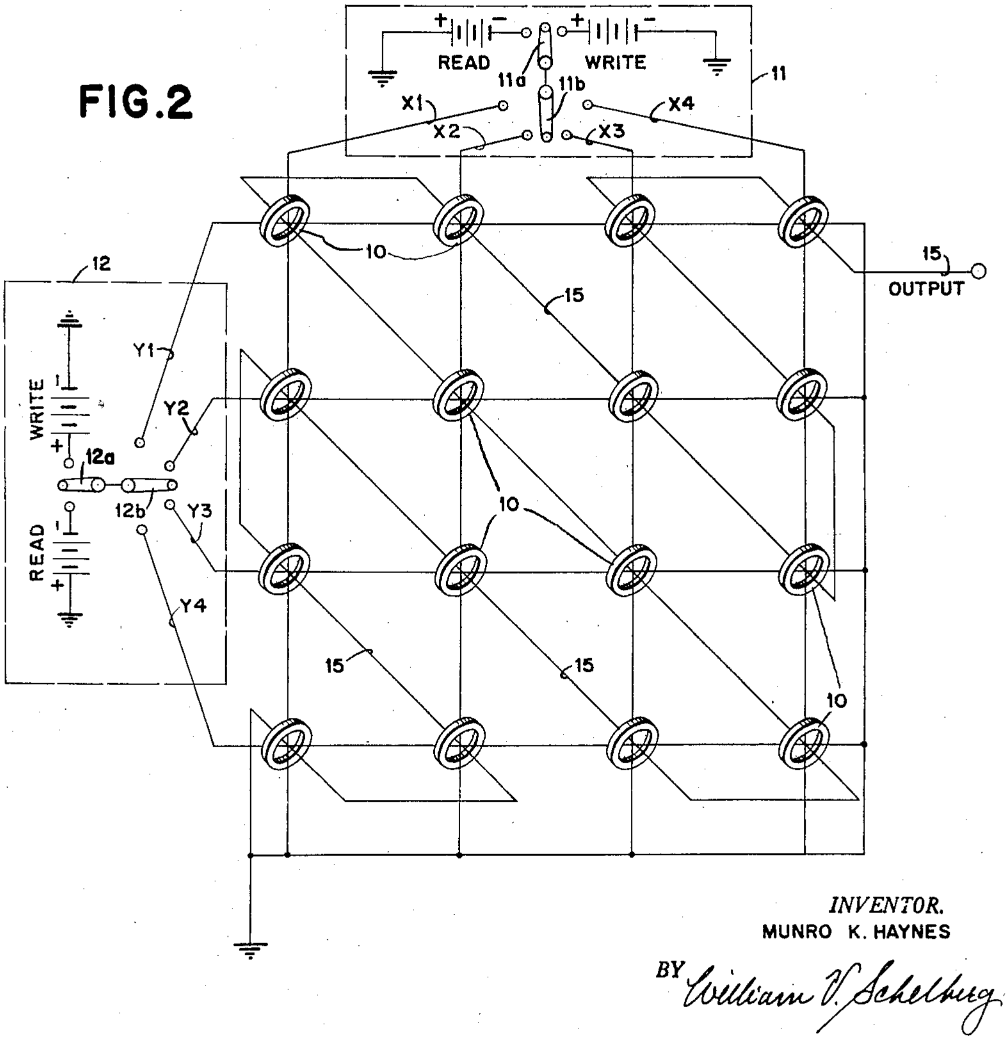
Figure 2 is a schematic representation of a two dimensional array of magnetic cores used in explanation of the invention.
Figure 3A:
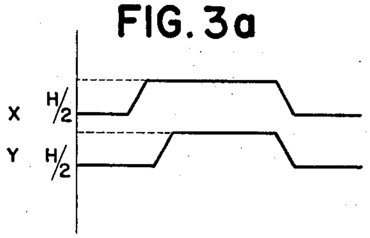

Figure 3*a* is a representation of the pulse current waveforms applicable to the array shown in Figure 2.

Figure 3B:
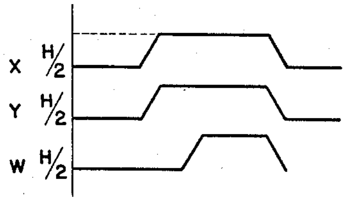

Figure 3*b* is a representation of current waveforms used in explanation of a further modification.

Figure 4:
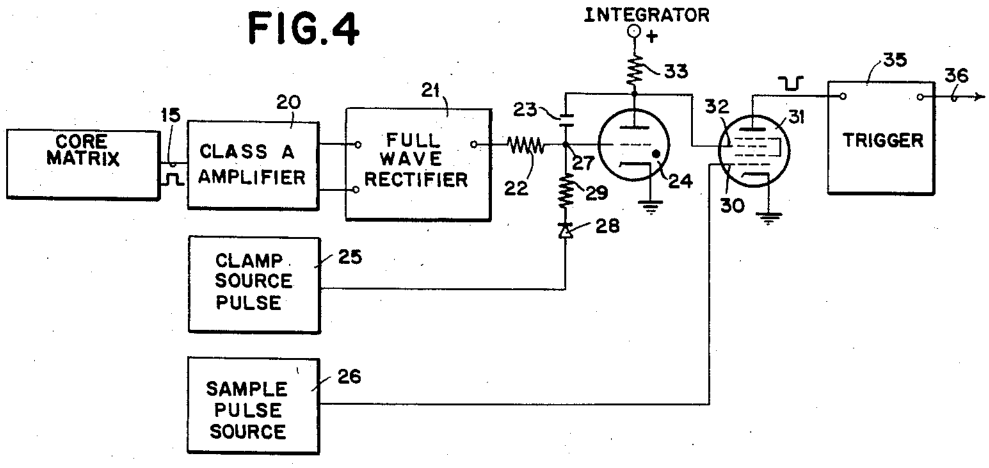

Figure 4 is a circuit diagram for integrating the output of a memory matrix in accordance with the invention.

Figure 5:
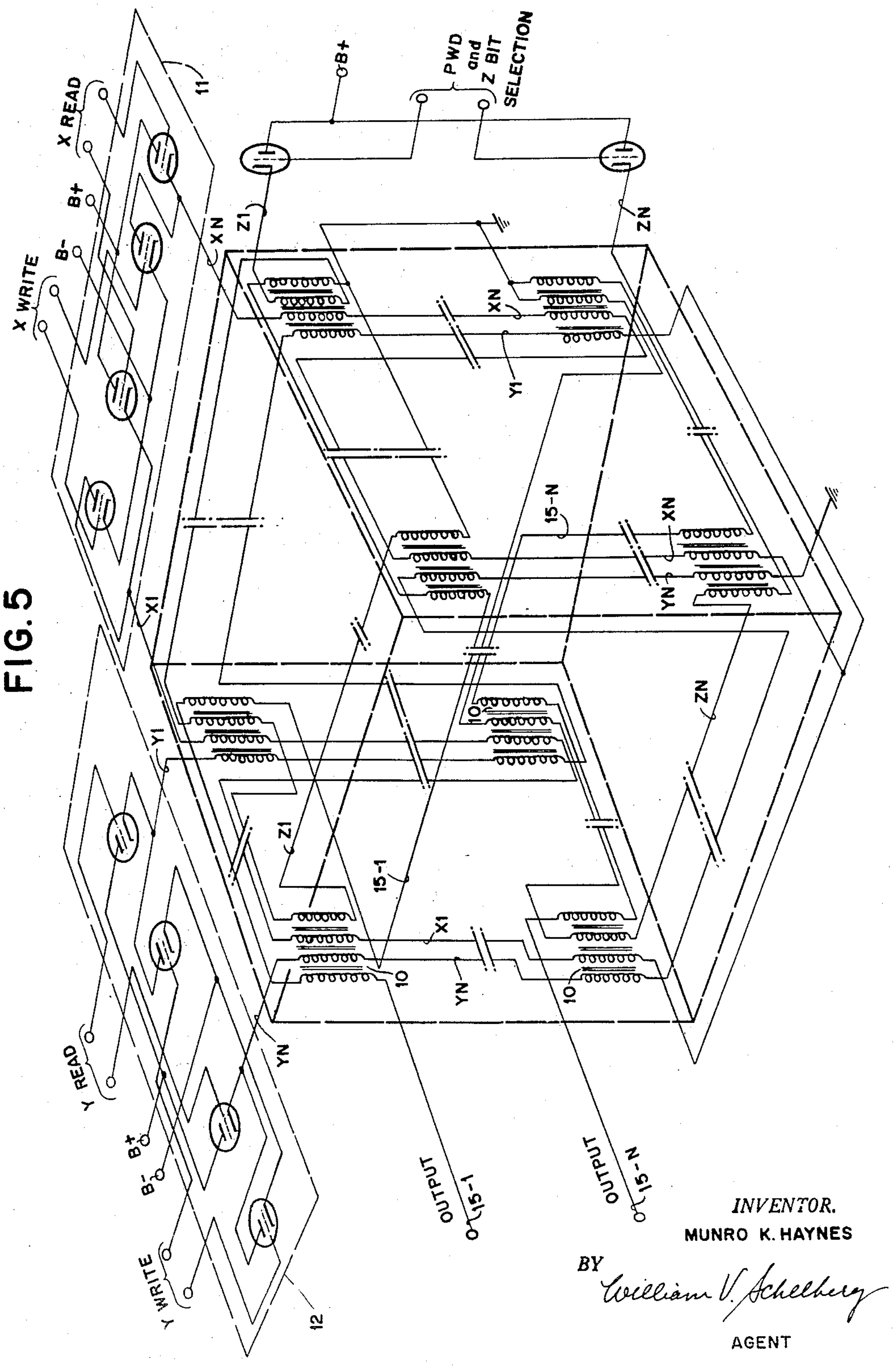

Figure 5 is a schematic view of a three dimensional array of magnetic cores with which the circuit of Figure 4 is used.

Figure 6:
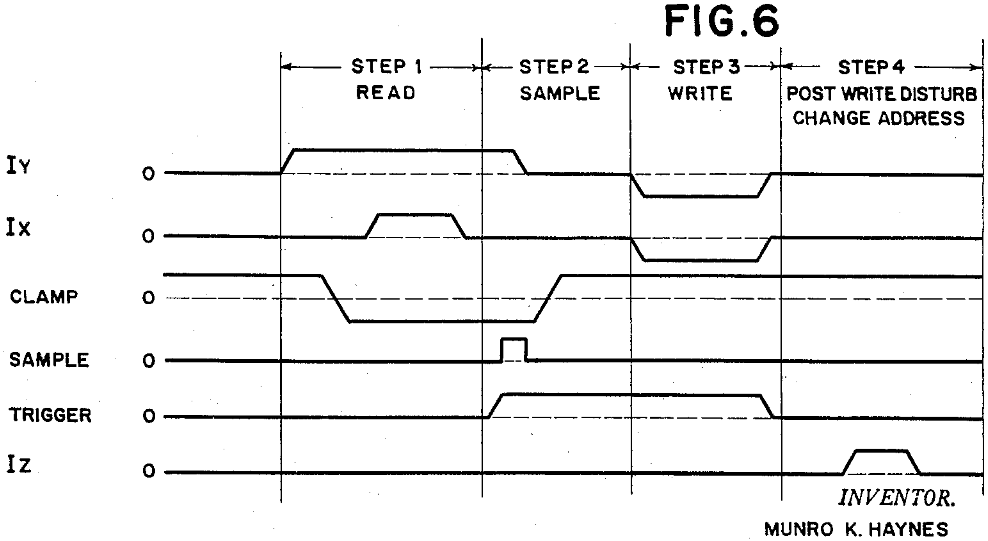

Figure 6 represents the current waveforms of pulses applicable to the circuit shown in Figure 4.

Figure 1:
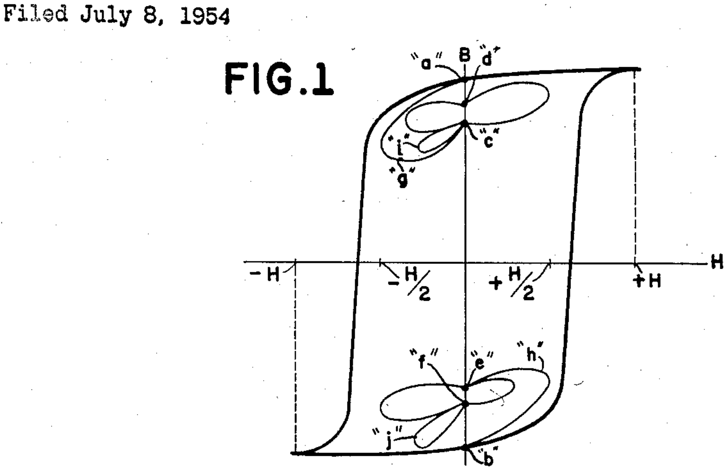
Figure 1 is a curve of the magnetic characteristics of the materials which may be used for memory elements.

The storage of binary information through establishing representative states of magnetization in bistable magnetic devices is well known. In such systems magnetic cores having a somewhat rectangular hysteresis characteristic as shown in Figure 1 are employed and are driven to one or the other of their stable residual states by energizing windings which embrace the core and apply a magnetomotive force thereto of desired magnitude and direction.

One of the stable remanence states is arbitrarily chosen to represent a binary one as point *a* and the other state, point *b*, then represents a binary zero. When a change from one residual state to the other takes place, as the magnetic field collapses and builds up in the other direction, an output voltage is induced in the windings linking the core and this induced voltage may be used for indicating that a change from one state to the other has occurred.

Where a great number of cores are used in a memory organ it is convenient to consider them as being connected and arranged in certain geometrical form. Such an array is shown in Figure 2 with the cores 10 shown as toroids and positioned in rows and columns. Each column of cores 10 is linked by a winding X having one turn and each row of cores is linked by a winding Y also shown as having a single turn. The form of the cores may vary as well as the number of turns of the X and Y windings as the present invention contemplates the use of these cores and windings in any conventional form.

A coincidence of two input signals is required to provide a magnetomotive force sufficient to overcome the coercive force of any one core and for this purpose an X coordinate switch 11 and a Y coordinate switch 12 is provided. While diagrammatically shown for purposes of explanation, such a switch device may be in the form of a diode matrix with separate X and Y windings on each core for read and write operations, as shown in the copending U.S. application, Serial No. 376,300, filed August 25, 1953, now Patent No. 2,739,300, or a bidirectional switch device such as that shown and described in the article "Ferrites Speed Digital Computers" in the April 1953 "Electronics" publication.

Consider, for example, a core having a magnetic state represented as point *b* on the curve of Figure 1. Application of a force of $$\frac{H}{2}$$

magnitude and less than the coercive force, is ineffective to completely flip the core from state *b* to state *a*, however, a force of +H magnitude causes the magnetic state to be reversed in direction and, upon relaxation of this force, the core remains at point *a*. By applying a pulse providing $$\frac{H}{2}$$

force one one of the vertical windings X and a coincident pulse to one of the row windings Y through manipulation of switches 11*a*—11*b* and 12*a*—12*b*, a total magnetomotive force of H is developed in the core with which the selected X and Y lines intersect. Only this core will then change states, however, each of the other cores embraced by the X and Y windings will have been subjected to $$\frac{H}{2}$$

magnetomotive force. An output winding 15 interlinks each of the cores in the four by four array illustrated and the voltages developed therein are a composite of the effects developed in all of the cores. In storing a binary one representation in a selected core, the sense winding circuit may not be activated, however, on interrogation to determine which one of the two binary representations is stored in a particular core, the effects of the half selected cores may be such as to obliterate the output signal. To read the selected core a pulse is applied to the X winding and to the Y winding through the switches 11 and 12 in a sense opposite to that for writing. This causes a total mmf. of —H to be provided at the core at the intersection of the pulsed lines and, if it stands at point *a*, a relatively large change in flux is obtained. If the core stands at point *b* a small flux change occurs due to departure of the cores from an ideal rectangular characteristic.

The half selected cores experience some flux changes causing a composite voltage to develop in the output winding 15 which contributes to the total signal obtained and may be of such magnitude cumulatively in adding to or subtracting from the output of the selected core that the latter cannot be distinguished. To avoid this problem to a degree, the output winding 15 is conventionally wound in zig-zag fashion so as to cancel out some of the half selected core outputs and/or the size of the array limited.

The basic principle of the first read method to be described resides in applying the selected X and Y line pulses displaced in time so that the rise in one is completed before the rise in the other is started but with sufficient overlaps to insure reading of the selected core after the rise period of the later pulse, as shown in Figure 3*a*. Either the X or Y driver is delayed a few microseconds and, as the half selected output of a core rises and decays in about two thirds the core switching time, only one half the unwanted signal will have a magnitude large enough to contribute to the output from the selected core.

Since the magnitude of the undesired transients is proportional to the driving current magnitude it is possible to further reduce the noise level by making the delayed pulse of lesser magnitude. For example, as seen in Figure 3*b*, the selection of a core may be made by coincident application of three currents, any two of which combined are insufficient to exceed the coercive force, and the relevant noise level can be reduced to one-third that obtainable by simultaneous rise of all currents. It is obvious that further expansion in the number of selecting circuits may be made.

The read technique described above has three known advantages. First, it improves discrimination between a binary one and a binary zero output on either an amplitude or time selection basis and allows a wider range of variation in driving currents without reduction in reliability. Second, it reduces by one-half the number of cores in a given array or sense winding configuration which contribute to "delta" interference or, conversely, doubles the size (linear dimension) of the array which a single sense winding may serve with the same "delta" factor. This result is obtained since the transients due to the first pulse or pulses are dissipated before the second or last pulse is applied. Third, it enables the use of the matrix principle in driving one set of lines of an array with high current isolation diodes for multiple path reduction, which diodes have recovery time effects in their back resistance characteristic, by applying current through that set first, allowing the back resistances to recover and the currents to stabilize, then applying the second or last current pulse to the other set of lines which actually reads the information from the array.

The term "delta" is defined as the difference between the half selected output of a core storing a binary one and that of a core storing a binary zero representation, which indicates that the amount of noise developed depends upon previous core history. To reduce the delta magnitude a post-write-disturb pulse is employed as will now be described with further reference to Figure 1. As mentioned heretofore, the residual states *a* and *b* are stable remanence conditions, however, their stability is with reference to the sense of magnetization rather than exactness of their position. The points so labeled in the figure represent an undisturbed one and zero and the magnitude of flux change for a core storing a one is largest when undisturbed and energized in the read direction by a half selection current and going to point *c* along the curve *g* when the force is relaxed. From this stable point with a half select current in the write direction, the core will stand at point *d* with the flux change being less on a subsequent half selection read disturbance and amounting to the distance between points *c* and *d* substantially along the B axis.

With the core storing a zero representation, the flux change is largest when undisturbed (point *b*) and energized in a write direction by a half selection current going to point *e* along the curve *h*. A half select current in the read direction now causes the core to stand at point *f* and the flux change is less on a subsequent half selection write disturbance or graphically the distance along the B axis from *f* to *e*.

The sense winding signal is the resultant of all the voltages induced therein from half selection read-out of the row and column cores standing variously at one and zero states, plus the full read-out applied to the selected core at the row and column intersection. With the cores in disturbed positions, those standing at point *c* and half selected experience a flux change equal in magnitude in both directions since a minor hysteresis loop *i* away from and back to point *c* is traversed and the net flux change is zero.

Similarly, those half selected cores storing a binary zero and disturbed so as to rest at point *f* likewise experience a net flux change of zero in traversing a minor loop *j* from point *f* to return. As the half select current is turned on, loop *j* is traversed to the extreme left position with a flux change in one direction produced and, as the select current is turned off, the lower half of the loop is traversed back to point *f* with an equal flux change in the reverse direction.

Traversal of a minor hysteresis loop with zero net flux change or returning to the same stable point, as described, is corroborated by the fact that the stored information is not destroyed by repeated application of half selection read currents. The integral of the signal produced by half-selection of a disturbed core extending from before rise of current to after the end of the fall of current therefore is zero and, if the composite signal appearing on the output winding 15 is integrated over this period, only the output from the selected core is obtained.

A circuit arrangement for accomplishing this purpose is illustrated in Figure 4 with the magnetic core matrix shown in block form. The storage matrix is shown in greater detail in Figure 5 where a cubical representation of an array of any desired capacity is illustrated having only the four corner cores 10 and associated windings schematically shown to avoid confusion of the drawing. Each X, Y plane is similar to the two dimensional array shown in Figure 2 but with a fourth winding provided for each core in each Z plane. In writing a binary word, a two dimensional address $(X+Y)$ selects a word line and operation through the third dimension (Z) activates the several core elements forming the line in accordance with the character of the corresponding word bits. The word line extends through a plurality of planes and comprises a number of the cores 10 equal to the number of bits. Energization of a selected X and a selected Y line then provides $$\frac{+H}{2}$$

magnetomotive force individually or a total of +H force, allowing each core jointly linked to change remanence states, however, energization of the selected bit plane or Z windings provides an inhibiting force of $$\frac{-H}{2}$$

to certain of the cores forming the word line so that no net change takes place in those cores. In other words, with each core initially set at zero, each would register and store a binary one unless inhibited by the Z plane pulse.

The output winding 15 is laced through the cores in conventional zig-zag fashion causing some of the half select currents to cancel out, however, as a result, the read out signal from a selected core may be of either polarity depending upon the position of the core in the matrix. As shown in Figure 4, the winding 15 is connected to the input of a conventional class A amplifier 20 with the amplified positive or negative signal applied to a full wave rectifier 21. The use of a unipolar sense winding is contemplated, however. A negative signal is obtained from the rectifier output if a selected core changes remanence states and is applied to an integrating amplifier circuit including a resistor 22, a capacitor 23 and tube 24. The capacitor 23 is the integrating element per se and the sum of the voltages appearing on the output line over the time of integration is applied to the grid and plate of the tube 24 as shown by the following equations:

$$i=\frac{dQ}{dt}=C\frac{dv}{dt}$$

assume $Vo=0$ at $t=0$ $$V=(V-Vo)=\int_0^T dv=\int_0^T \frac{i}{C}dt$$

$$V=\frac{1}{C}\int_0^T idt=\frac{1}{RC}\int_0^T Edt$$

The period of integration or time T is determined by activation of a clamp pulse source 25 and a sample pulse source 26, each of which may be of any conventional type and are shown in block diagram form as they form no part per se of the present invention. The clamp pulse source 25 is coupled to a terminal 27, located at the junction of the resistor 22, capacitor 23 and grid of the tube 24, through a diode 28 and resistor 29. The sample pulse source 26 is connected to the grid 30 of a pentode gate tube 31. The grid 32 of tube 31 is coupled to the plate of tube 24 and this latter element connected to a source of plate potential (not shown) through a resistor 33. The plate of tube 31 is connected to the plate of the "off" tube of a conventional electron tube trigger circuit 35 shown in block form and the cathodes of each of the tubes 24 and 31 are grounded.

Terminal 27 is clamped by a positive output from the clamp pulse source up to the time of application of coincident X and Y read pulses to the storage matrix where-upon the clamp pulse output swings negative to block current flow through the diode 28. The output signal from the rectifier 21 is now integrated by condenser 23, varying the conductivity of tube 24 and consequently the potential applied to the grid 32 of the pentode gate tube 31. After the X and Y pulses have terminated, a positive pulse is applied from the sample pulse source 26 to the grid 30 of the gate tube at a time T and the integrated signal, if one has been developed in the selected core, causes the gate tube to conduct. The plate of the "off" tube in the trigger 35 is pulled down to a lower potential by conduction through the gate tube and the trigger flips, developing a positive pulse on lead 36 connected to the plate of the "on" tube as the latter is forced "off." The clamp pulse source 26 now swings positively, discharging the condenser 23 to establish a datum potential level for the next read cycle.

The period for integration is chosen for the duration of a read cycle only, where the complete operating cycle comprises four steps designated read, sample, write and post-write disturb intervals as indicated in Figure 6. The process of interrogation destroys the stored information and consequently a write step follows the read and sample steps in returning the core to its state prior to interrogation. The fourth step is employed for applying a post-write-disturb pulse to the Z windings linking each of the cores causing them to traverse their minor hysteresis loops, as described heretofore in connection with Figure 1, and this latter interval is also employed for changing the address switches 11 and 12 to select the succeeding core to be interrogated.

Since integration circuits are not perfect, the staggered read and integration systems may be combined to provide a more reliable system, however, it is to be understood that they may be employed to advantage separately and apart from one another. The pulse waveforms shown in Figure 6 are drawn with reference to such a combined arrangement and it is to be noted that the Y pulse is first applied and, after the transients developed thereby decay, the X pulse is applied. During this step 1 interval, the clamp pulse is removed just prior to application of the X pulse to allow the integrator to function. During step 2, the sample pulse is applied prior to termination of the Y pulse and while the clamp pulse is ineffective, so that the delta disturbance due only to the X puse is integrated so as to reduce the dynamic range of the integrator circuit and consequent recovery time problems. If a binary one has been read from the selected memory core during the integrated interval, the gate tube 31 conducts and the output of trigger 35 as it appears on lead 36 is up. As the clamp pulse swings positive, the condenser 23 is discharged in preparation for the next cycle of integration. Step 3 is provided for writing information or restoring the sensed information into the core and for this purpose the X and Y pulses are of opposite direction to that employed for reading and are simultaneously applied. Step 4 is used for changing the address of the switches 11 and 12 (Fig. 5) so as to interrogate another core as selected by logical circuits of the apparatus (not shown) with which the memory organ is employed. This interval is also used for applying a post-write-disturb pulse to the Z plane windings which, as described heretofore, is of a magnitude to provide $$\frac{-H}{2}$$

magnetomotive force to all of the cores of the array. To reflect, the use of the Z winding is double purpose in that the Z winding is utilized to inhibit the switching of those cores in a selected Z plane which are in turn selected by the X and Y address and the same Z winding is again utilized to traverse the $h$ or $g$ curve before the next read interval in order to minimize any undesired output from the non-selected cores.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for registering pulse information magnetically by the transmission of electrical impulses, comprising a plurality of bistable magnetic cores each linked with a plurality of windings, including a common sense winding means for selectively applying said impulses to a pair of said windings simultaneously to jointly cause one of said cores to assume a first stable remanence state, said means including further means for thereafter applying said impulses in an opposite sense displaced in time but at least in partial coincidence to said pair of windings to cause said one core to attain a second stable remanence state and develop an output signal in said common sense winding should said core be in said first stable state.

2. Apparatus as set forth in claim 1, including means for integrating said output signal during the interval that said signals of opposite sense are coincident whereby disturbance signals contributing to said output signal developed in said common sense winding are substantially eliminated.

3. Apparatus for registering pulse information magnetically by the transmission of electrical impulses, comprising a plurality of bistable magnetic cores each linked with a plurality of windings, first means for selectively applying said impulses to a pair of said windings simultaneously to jointly cause one of said cores to assume a first stable remanence state in a write cycle, disturb means for thereafter applying said impulses to a further winding on said one core to cause said one core to assume a disturbed bistable state, said first means including further means for subsequently applying said impulses in an opposite sense to said pair of windings during a read cycle to cause said one core to attain a second stable remanence state and develop an output signal in a further one of said windings should said core be in said first stable state, and means for integrating said output signal within the duration of said read cycle only to eliminate disturbance signals contributing to the output developed in said further windings.

4. A magnetic memory system comprising an array of magnetic cores arranged in rows and columns, a first set of windings linking cores in each of said columns, a second set of windings linking cores in each of said rows, write means for selectively energizing one of said windings of said first set in coincidence with one of said windings of said second set to store a binary representation as a particular remanence state in the core embraced by both of said energized windings, disturb means for thereafter energizing a further winding on said cores to cause said cores to assume a disturbed remanence state, an output winding linking each of said cores, read means operative for energizing a selected one of said windings of said first and second set in an opposite sense to develop a signal voltage in said output winding indicative of the magnetic state of the core embraced thereby, means coupled to said output winding for amplifying and for integrating said signal voltage only within the period of operation of said read means whereby disturbance signals induced in said output winding by partially excited ones of said cores is substantially eliminated.

5. A magnetic memory system comprising plural arrays of magnetic cores arranged in rows and columns, a first set of windings linking the cores in each of said columns, a second set of windings linking the cores in each of said rows, write means for selectively energizing one of said windings of said first set in coincidence with one of said windings of said second set to store a binary representation as a particular remanence state in the core embraced by both of said energized windings, inhibiting windings linking each of said cores in each said array, means for selectively energizing said inhibiting windings in a sense opposite to that of said write means and simultaneously therewith to prevent a change in the remanence state of the cores in a selected one of said arrays and for energizing said inhibiting windings with a half select current impulse subsequent to the operation of said write means to cause each of said cores to assume a disturbed state, read means operative for energizing a selected one of said windings of said first set and a selected one of said windings of said second set in a sense opposite to that of said write means, an output winding linking each of said cores, and means for integrating the voltage developed in said output winding only within the interval when said read means is operative whereby disturbance signals induced in said output winding by partially excited ones of said cores is substantially eliminated.

6. A magnetic memory system for storage of binary representations comprising plural arrays of magnetic cores arranged in rows and columns, a first set of windings linking the cores in each of said columns, a second set of windings linking the cores in each of said rows, write means for selectively energizing one of said windings of said first set in coincidence with one of said windings of said second set to store a binary representation as a first remanence state in the core embraced by both of said energized windings, an inhibiting winding linking each core of each said array, means for selectively energizing said inhibiting windings in a sense opposite to that of said write means and simultaneously therewith to prevent a change in the remanence state of the cores in selected ones of said arrays and for energizing said inhibiting windings with a half select current impulse subsequent to the operation of said write means to cause each of said cores to assume a disturbed remanence state, a common output winding linking each of said cores, read means operative for energizing a selected one of said windings of said first set and a selected one of said windings of said second set in an opposite sense and displaced in time but at least in partial coincidence to cause said fully energized core to attain a second remanence state and develop an output signal in said common output winding, and means for integrating the signal developed in said output winding only within the interval when said read means is operative whereby disturbance signals induced in said output winding by partially excited ones of said cores is substantially eliminated.

7. Apparatus for registering pulse information magnetically by the transmission of electrical impulses comprising a plurality of bistable magnetic cores each linked by a plurality of windings including a common sense winding, means for selectively applying said impulses to at least two of said windings simultaneously to jointly cause one of said cores to assume a first stable remanence state, said means including further means for thereafter applying said impulses in an opposite sense to at least two of said windings with that applied to one winding displaced in time from that applied to the remainder but at least in partial coincidence to cause said one core to attain a second stable state and develope an output signal in said sense winding should said core be in said first stable state.

8. Apparatus as set forth in claim 7, including means coupled to said common sense winding for integrating said output signal during the interval that said signals of opposite sense are coincident and over the rise and fall time of said displaced in time impulse.

9. A magnetic core memory system comprising an array of saturable magnetic cores arranged with a plurality of energizing windings, first means for applying electrical impulses to at least two of said windings in coincidence to jointly cause one of said cores to assume a first stable remanence state in a write cycle, disturb means for thereafter applying an electrical impulse to all of said cores to cause said cores to assume a disturbed remanence state, said first means including further means for applying electrical impulses in an opposite sense to at least two of said windings during a read cycle to jointly cause one core to attain a second stable state of remanence and develope an output signal on a further winding linking each core of said array should said one core be in a first stable state, and means coupled to said further winding for integrating said output signal within the duration of said read cycle only to cancel out disturbance signals contributing to the output developed.

References Cited in the file of this patent

UNITED STATES PATENTS

| | | |
|---|---|---|
| 2,691,154 | Rajchman | Oct. 5, 1954 |
| 2,691,155 | Rosenberg | Oct. 5, 1954 |
| 2,691,156 | Saltz | Oct. 5, 1954 |
| 2,709,248 | Rosenberg | May 24, 1955 |
| 2,736,880 | Forrester | Feb. 28, 1956 |
| 2,819,456 | Stuart-Williams | Jan. 7, 1958 |

OTHER REFERENCES

A Publication entitled "The MIT Magnetic Core-Memory," published in the proceedings of the Eastern Joint Computer Conference, Washington, D. C., December 1953 (pages 37–42).